(12) United States Patent
Elgowainy et al.

(10) Patent No.: US 9,739,418 B2
(45) Date of Patent: Aug. 22, 2017

(54) ENHANCED METHODS FOR OPERATING REFUELING STATION TUBE-TRAILERS TO REDUCE REFUELING COST

(71) Applicant: UChicago Argonne, LLC, Chicago, IL (US)

(72) Inventors: Amgad Elgowainy, Lisle, IL (US); Krishna Reddi, Westmont, IL (US)

(73) Assignee: UChicago Argonne, LLC, Chicago, IL (US)

( * ) Notice: Subject to any disclaimer, the term of this patent is extended or adjusted under 35 U.S.C. 154(b) by 662 days.

(21) Appl. No.: 14/039,120

(22) Filed: Sep. 27, 2013

(65) Prior Publication Data
US 2015/0090364 A1    Apr. 2, 2015

(51) Int. Cl.
*B65B 37/00* (2006.01)
*F17C 5/06* (2006.01)
(Continued)

(52) U.S. Cl.
CPC .............. *F17C 5/06* (2013.01); *F17C 5/007* (2013.01); *F17C 5/04* (2013.01); *F17C 2205/0107* (2013.01); *F17C 2205/0134* (2013.01); *F17C 2205/0326* (2013.01); *F17C 2221/012* (2013.01); *F17C 2223/0123* (2013.01); *F17C 2223/035* (2013.01); *F17C 2225/0123* (2013.01); *F17C 2225/036* (2013.01); *F17C 2227/0157* (2013.01); *F17C 2227/0185* (2013.01); *F17C 2227/0337* (2013.01); *F17C 2227/043* (2013.01); *F17C 2250/01* (2013.01); *F17C 2250/03* (2013.01); *F17C 2260/046* (2013.01); *F17C 2265/065* (2013.01);
(Continued)

(58) Field of Classification Search
CPC ...... F17C 2227/0185; F17C 2227/0157; F17C 2227/041; F17C 2227/043; F17C 2225/036; F17C 2250/01; F17C 2250/03; F17C 2223/035; F17C 2205/0134; F17C 2270/0139; F17C 2265/065
See application file for complete search history.

(56) References Cited

U.S. PATENT DOCUMENTS 7,921,883 B2    4/2011   Cohen et al.
2005/0056661 A1  3/2005   Casamatta et al.
(Continued)

FOREIGN PATENT DOCUMENTS

EP        1800930 A1      6/2007
WO    WO2011133296 A1    10/2011

*Primary Examiner* — Jason K Niesz
(74) *Attorney, Agent, or Firm* — Joan Pennington

(57) ABSTRACT

A method and apparatus are provided for operating a refueling station including source tube-trailers and at least one compressor to reduce refueling cost. The refueling station includes a gaseous fuel supply source including a plurality of tanks on a tube trailer coupled to a first control unit, and high pressure buffer storage having predefined capacity coupled to a second control unit and the first tanks by a pressure control valve and the first control unit, and at least one compressor. The refueling station is operated at different modes depending on a state of the refueling station at the beginning of each operational mode. The refueling system is assessed at the end of each operational mode to identify the state of the system and select a next mode of operation. The operational modes include consolidating hydrogen, or any gaseous fuel, within the tubes mounted on the trailer.

13 Claims, 17 Drawing Sheets

(51) Int. Cl.
    *F17C 5/00*         (2006.01)
    *F17C 5/04*         (2006.01)

(52) U.S. Cl.
    CPC ............. *F17C 2270/0139* (2013.01); *F17C 2270/0171* (2013.01); *Y02E 60/321* (2013.01)

(56) References Cited

U.S. PATENT DOCUMENTS

| | | |
|---|---|---|
| 2006/0118575 A1 | 6/2006 | Boyd et al. |
| 2010/0167155 A1 | 7/2010 | Kim et al. |
| 2011/0093305 A1 | 4/2011 | Alexander et al. |
| 2011/0259469 A1 | 10/2011 | Harty et al. |

# ENHANCED METHODS FOR OPERATING REFUELING STATION TUBE-TRAILERS TO REDUCE REFUELING COST

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

The present invention relates to a method and apparatus for operating a hydrogen refueling station including source tube-trailers and at least one compressor to reduce refueling cost for hydrogen, and gaseous fuels.

DESCRIPTION OF THE RELATED ART

While hydrogen refueling stations and hydrogen refueling is described in detail in the following description, it should be understood that the present invention is not limited to hydrogen. For example, the present invention advantageously is used with various gaseous fuels including compressed natural gas (CNG).

The use of hydrogen fuel cell electric vehicles (HFCEVs) is limited by available hydrogen refueling stations. An adequate hydrogen refueling network is needed to encourage manufacturing of HFCEVs.

A need exists for an effective method, apparatus, and system for implementing and operating hydrogen refueling stations to overcome challenges of developing an adequate refueling station network that is economically viable to enable large scale deployment of HFCEVs.

SUMMARY OF THE INVENTION

Principal objects of the present invention are to provide a method and apparatus for operating a hydrogen refueling station including source tube-trailers and at least one compressor to reduce hydrogen refueling cost. Important aspects of the present invention are to provide such method and apparatus substantially without negative effect and that overcome some of the disadvantages of prior art arrangements.

In brief, a method, apparatus, and system are provided for operating a refueling station, such as a hydrogen refueling station including source tube-trailers and at least one compressor to reduce hydrogen refueling cost. The hydrogen refueling station includes a plurality of tanks on a tube trailer coupled to a first control unit, and high pressure buffer storage having predefined capacity coupled to a second control unit and coupled to the first tube trailer tanks by a pressure control valve and the first control unit, and at least one compressor. The hydrogen refueling station is operated at different modes depending on a state of the hydrogen refueling station at the beginning of each operational mode. The hydrogen refueling system is assessed at the end of each operational mode to identify the state of the system and select a next mode of operation.

In another embodiment, the hydrogen refueling station includes a plurality of tanks on a tube trailer coupled to a first control unit, a second control unit and at least one compressor. The hydrogen refueling station is operated at different modes depending on a state of the hydrogen refueling station at the beginning of each operational mode. The hydrogen refueling system is assessed at the end of each operational mode to identify the state of the system and select a next mode of operation.

In accordance with features of the invention, one of the operational modes is provided when the buffer storage is at full capacity and a dispenser is activated by a vehicle to begin refueling, the dispenser is connected to a tube trailer for an initial vehicle fill. Then in the next operational mode, the dispenser is connected to the buffer storage to fill the vehicle.

In accordance with features of the invention, one of the operational modes is provided when the buffer storage is not at full capacity and a dispenser is activated by a vehicle to begin refueling, the dispenser is connected to a tube trailer for an initial vehicle fill. Then in the next operational mode, the dispenser is connected to the buffer storage to fill the vehicle.

In accordance with features of the invention, one of the operational modes is provided when the dispenser is not activated by a vehicle to begin refueling, and the buffer storage is not at full capacity, then the compressor operates to fill the buffer storage from the tube trailer.

In accordance with features of the invention, one of the operational modes is provided when the dispenser is not activated by a vehicle to begin refueling, and the buffer storage is at full capacity, then the compressor operates to consolidate hydrogen between the tubes within the tube trailer.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, apparatus, and system are provided for operating refueling station tube-trailers and compressor to reduce hydrogen refueling cost.

Figure 1A:
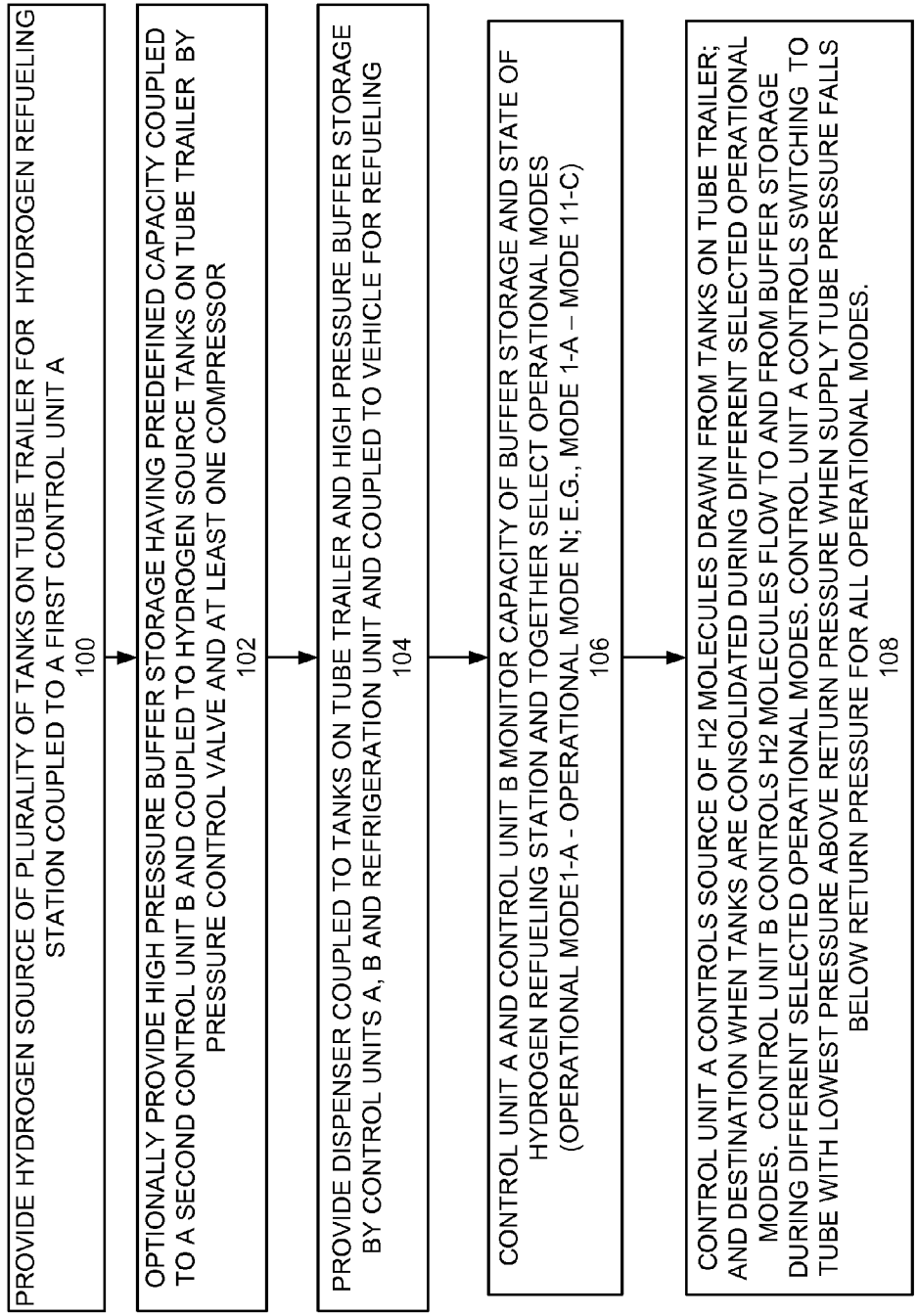
FIGS. 1A and 1B are flow charts respectively illustrating example steps for implementing hydrogen refueling station operation and selecting respective operational modes in accordance with the preferred embodiments.
Figure 1B:
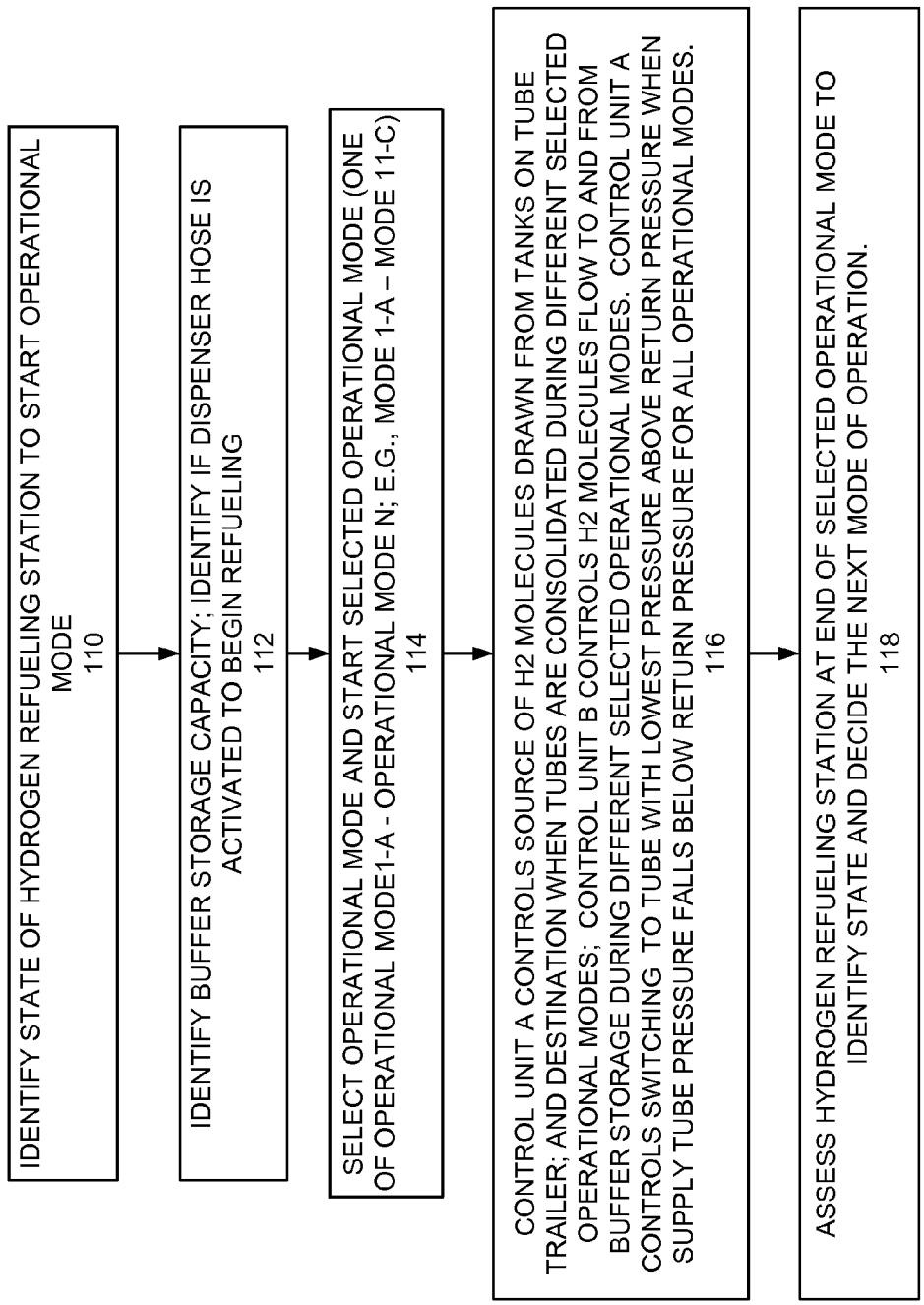

Having reference now to the drawings, in FIGS. 1A and 1B, there are shown flow charts respectively illustrating example steps for implementing and operating a hydrogen refueling station and selecting respective operational modes in accordance with the preferred embodiments.

Referring also to FIGS. 2, 3, 4, 5, 6, 7, 8, 9, 10, 11, 12, 13, 14, 15 and 16, there are shown respective schematic and block diagram representations of example apparatus operating in respective operational modes in accordance with the preferred embodiments.

As shown in FIGS. 2, 3, 4, 5, 6, 7, 8, 9, 10, and 11, the hydrogen refueling station includes a hydrogen source or supply source 201 with a plurality of tanks within a tube trailer, a control unit A 208, a control unit B 210, a pressure control valve 212 and a compressor 214 disposed between the control units A 208 and B 210, a refrigeration unit 216 coupled to a dispenser 218 and a high pressure buffer source 220. The hydrogen refueling station includes a respective vehicle tank source 202, a compressor source 204, and a compressor destination 206 provided with the respective operational modes in accordance with the preferred embodiments as illustrated in 2, 3, 4, 5, 6, 7, 8, 9, 10, and 11.

Figure 12:
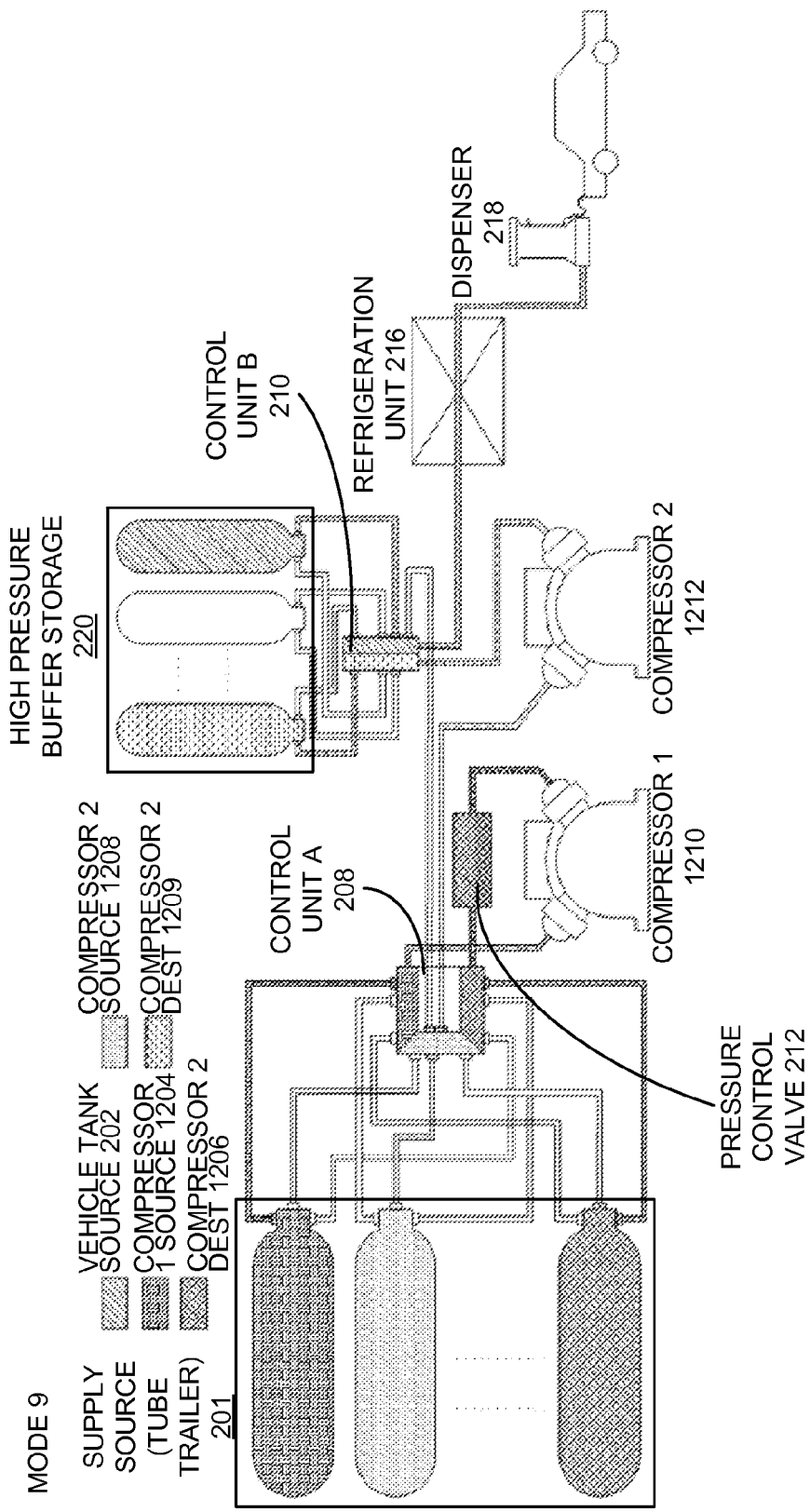
Figure 13:
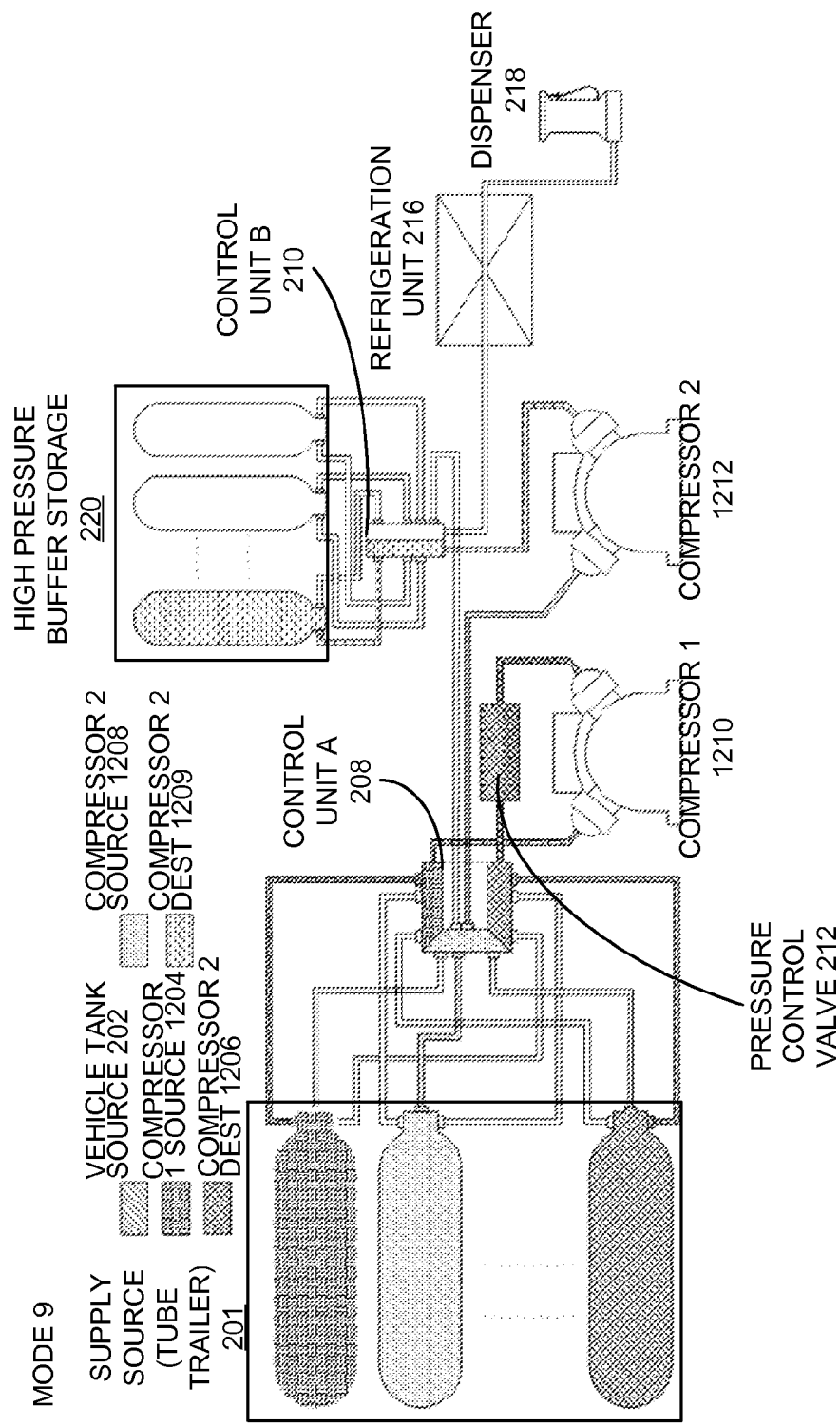

As shown in FIGS. 12 and 13, the hydrogen refueling station further includes a first compressor 1, 1210 and a second compressor 2, 1212. The hydrogen refueling station includes the respective vehicle tank source 202, a first compressor source 1204, a first compressor destination 1206, a second compressor source 1208, and a second compressor destination 1209, provided with the respective operational modes 9 and 10 in accordance with the preferred embodiments as illustrated in FIGS. 12 and 13. Other modes of operation similar to the modes 1 to 4 exist when there are two compressors at the refueling station. In such case mode 9 replaces mode 2B, and mode 10 replaces mode 3, while in all other modes (1A, 1B, 2A, and 4) only one compressor is in operation and the other compressor remains idle.

Figure 14:
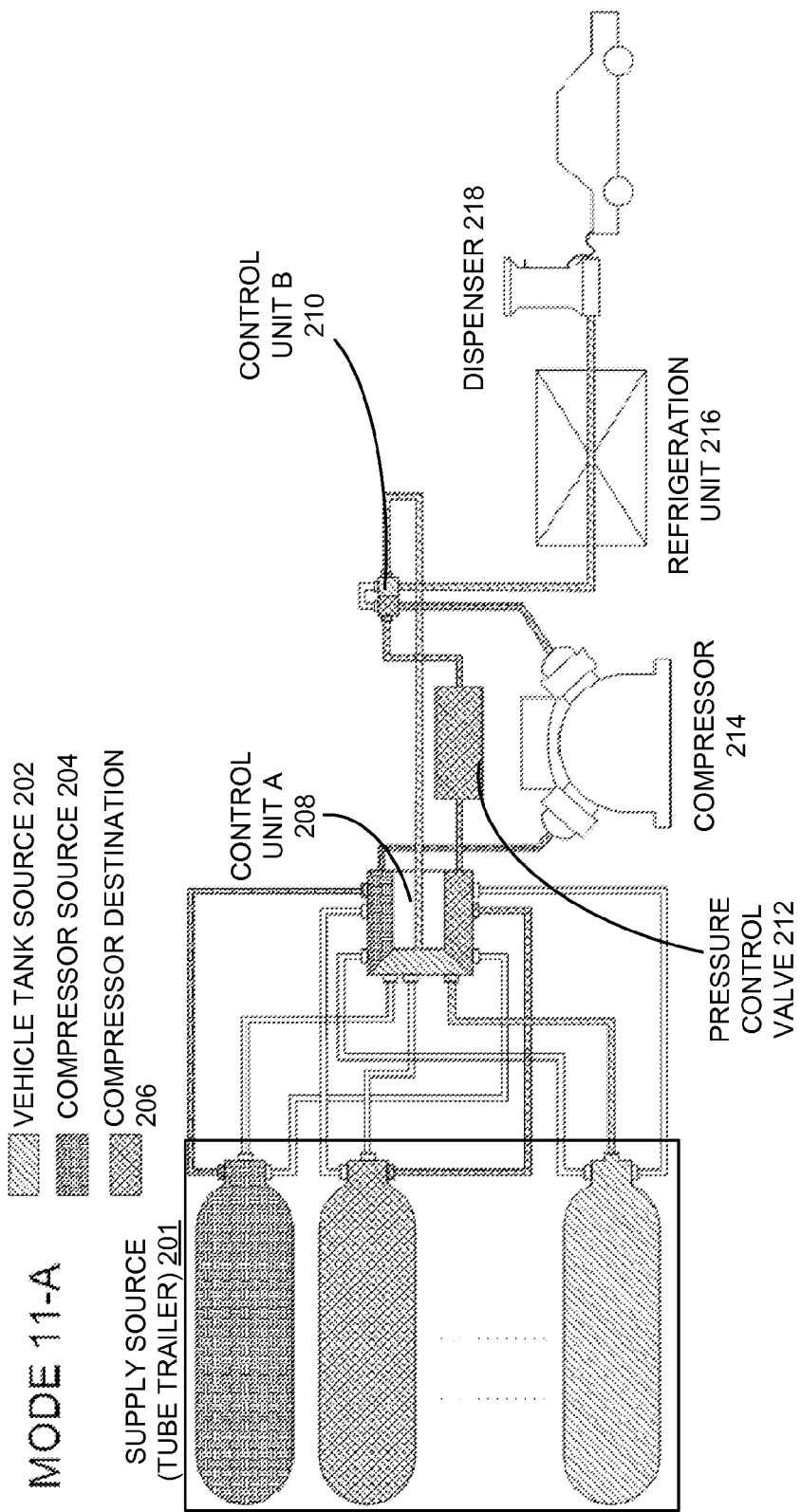
Figure 15:
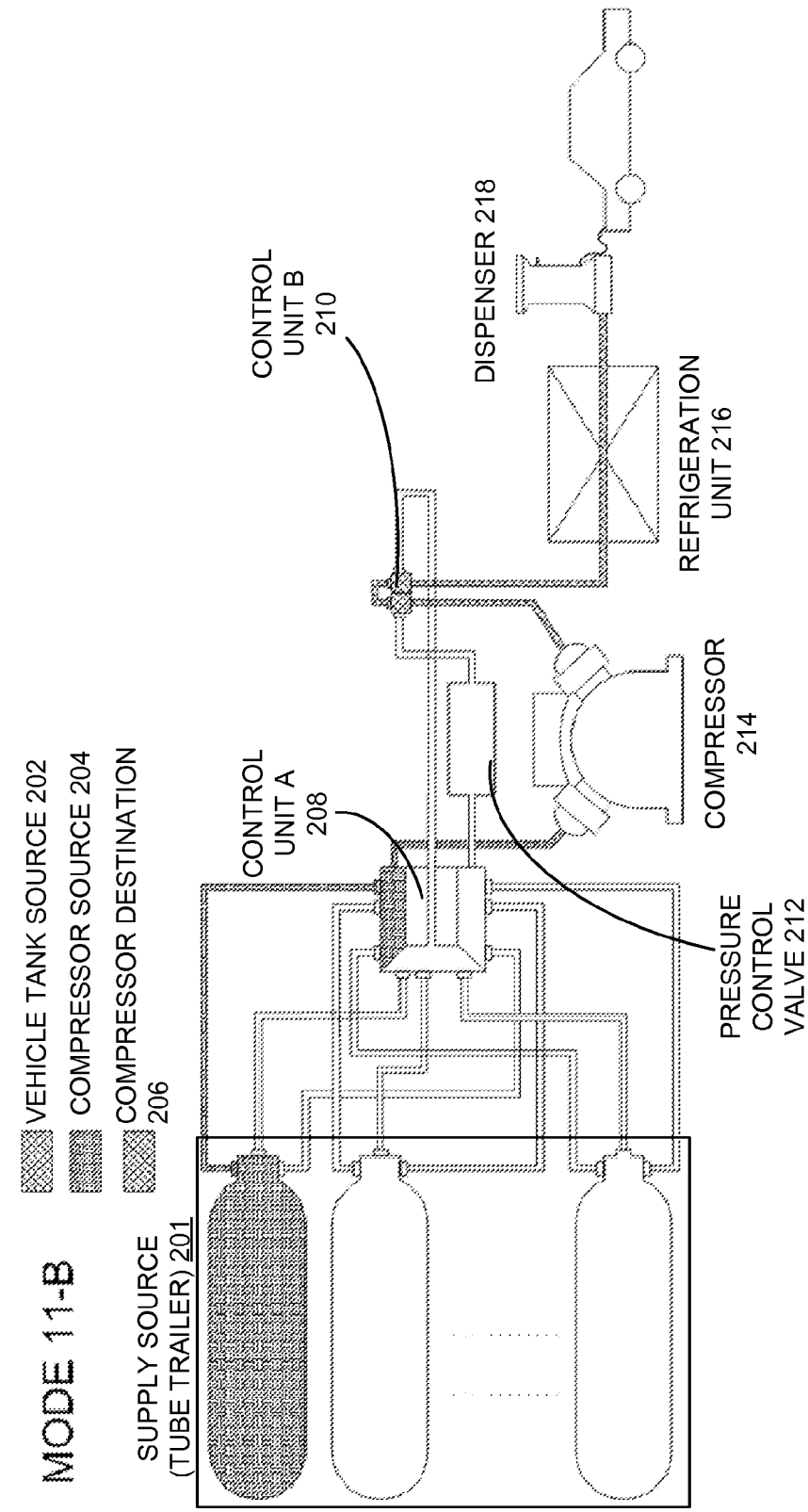
Figure 16:
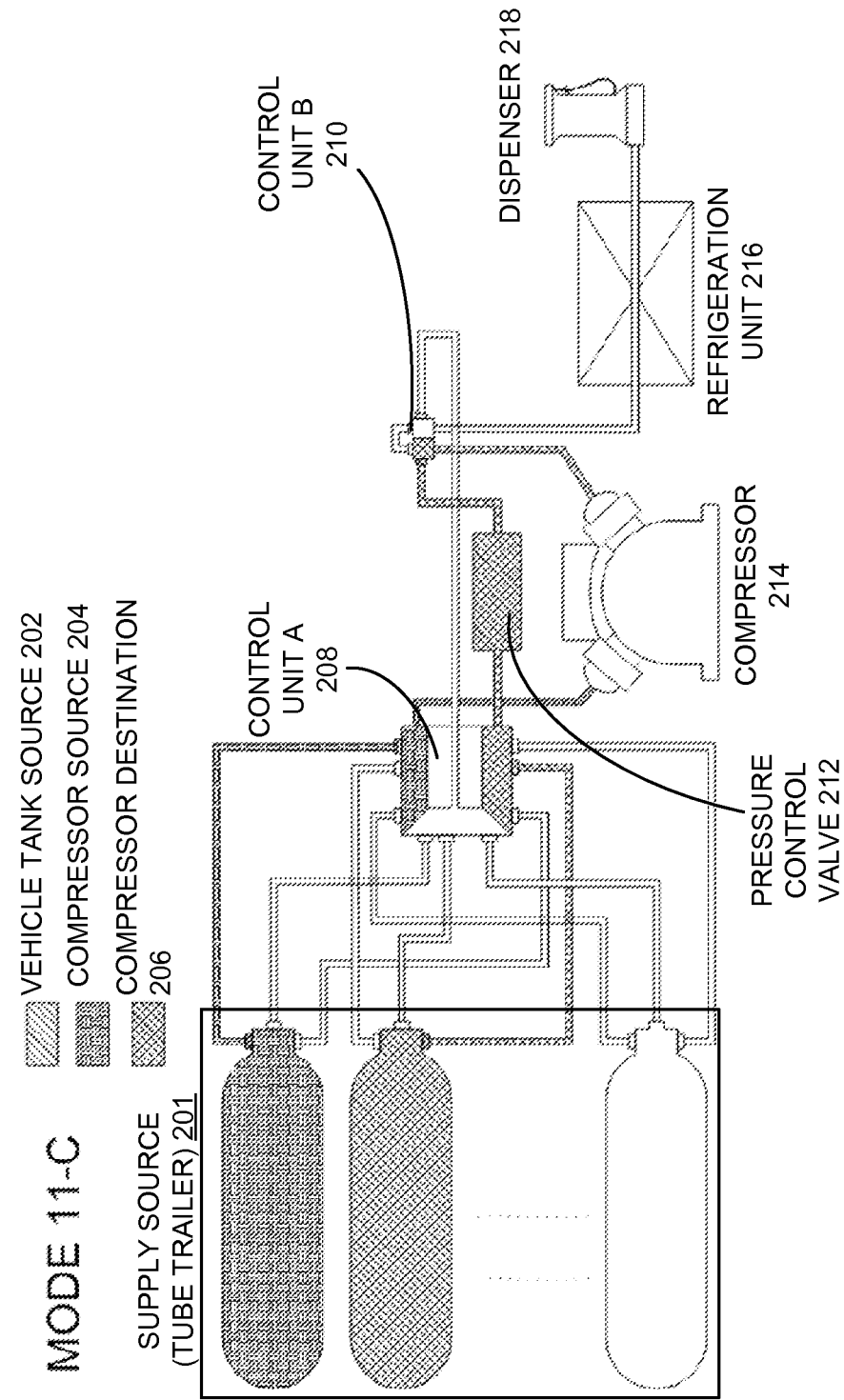

As shown in FIGS. 14, 15 and 16, the hydrogen refueling station is implemented without a high pressure buffer storage system. The hydrogen refueling station includes the hydrogen source or supply source 201 with the plurality of tanks within a tube trailer, the control unit A 208, the control unit B 210, the pressure control valve 212 and a compressor 214 disposed between the control units A 208 and B 210, the refrigeration unit 216 coupled to the dispenser 218, provided with the respective operational modes 11-A, 11-B, and 11-C in accordance with the preferred embodiments as illustrated in FIGS. 14, 15 and 16.

In accordance with features of the invention, the operational modes of the hydrogen refueling station exploits a synergy between tube trailers 201 and compressor 214 operation at various suction pressures during peak and off-peak demand periods. In a typical refueling station design, the installed compressor 214 is typically sized to satisfy the maximum demand at minimum suction pressure. For example, the minimum suction pressure is usually 20 bar, the typical pressure of hydrogen as produced by steam methane reforming or electrolysis. The compressor 314 has a suction pressure range with a maximum equal to at least the maximum working pressure of the tube trailer source 201 (when it is at full capacity) and a minimum equal to the return pressure of the tube trailer source 201 (regarded as the empty state). The gravimetric (mass) flow rate of hydrogen H2 through the compressor 214 or compressors 1210, 1212 varies with the suction pressure. The flow rate is highest at the maximum suction (i.e. maximum working pressure of the tube trailer source 201) and is lowest at the tube trailer source return pressure.

In accordance with features of the invention, the tube trailer source 201 includes multiple numbers of individual tanks or tubes mounted within a frame so as to enable hydrogen H2 transport complying with the Department of Transportation (DOT) regulations. Typically these tubes are interconnected via a control unit that enables flow of hydrogen from all the tubes. The control unit A 208 can regulate the flow of hydrogen H2 in and out of the tubes, and can also select the tube from which the hydrogen H2 can be withdrawn at any point of operation. The tube trailer source 201 is delivered to the refueling station at a pre-determined pressure and is usually emptied to an agreed minimum pressure or return pressure. The control unit A 208 can regulate the flow of hydrogen H2 between the tanks of the tube trailer source 201 in a hydrogen H2 consolidation operational mode.

In accordance with features of the invention, hydrogen H2 consolidation capability of the tube trailer source 201 includes the capability of pumping H2 between any two tubes mounted within the frame of the tube trailer source 201. In this configuration of tube trailer source 201, the control unit A 208 can select a source tube from which the H2 is withdrawn and the destination tube to which it is pumped and also enables a conduit of flow between the two tanks or tubes via the compressor 214. This operation will typically take place during low refueling demand periods (i.e., when the compressor 214 would otherwise be idle) throughout the day.

In accordance with features of the invention, the tube trailer source 201 hydrogen H2 consolidation capability is provided to maintain high pressure in at least one tank or tube to be withdrawn from by the compressor 214 during peak demand periods. Maintaining high suction pressure at the compressor inlet or compressor source 204 ensures high flow rate at the compressor outlet or compressor destination 206 to satisfy the high demand of hydrogen during peak periods. This consolidation strategy enables the use of a compressor 214 with a smaller volumetric capacity (rated flow rate) but running for more time to address a higher demand compared to a larger volumetric capacity compressor running for less time (usually during the peak demand hours).

Referring first to FIG. 1A, example steps for implementing a hydrogen refueling station of the preferred embodiment begin as indicated in a block 100, the hydrogen source 201 for the hydrogen refueling station is provided with the plurality of tanks on the tube trailer coupled to a first control unit A 208. As indicated in a block 102, the high pressure buffer storage 220 having a predefined maximum capacity optionally is provided coupled to the first and second control units A 208 and B 210 and coupled to the first tanks of hydrogen source 201 by the pressure control valve 212 and the first control unit A 208, and at least one compressor 214, or compressors 1210, 1212, such as shown in FIGS. 12 and 13.

In FIG. 1A, as indicated in a block 104, the dispenser 218 is selectively coupled to the plurality of tanks on the tube trailer of hydrogen source 201 and the high pressure buffer storage 220 by the first control unit A 208 and second control unit B 210 for respective operational modes. The dispenser 218 is coupled to the refrigeration unit 216 and is coupled to a vehicle and activated for refueling the vehicle.

In accordance with features of the invention, the hydrogen refueling station is operated at different modes depending on a state of the hydrogen refueling station at the beginning of each operational mode, including the demand for refueling at the dispenser. The hydrogen refueling system is assessed at the end of each operational mode to identify the state of the system and select a next mode of operation.

As indicated in a block 106, the first control unit A 208 and second control unit B 210 monitor capacity of the buffer storage 220 and the state of the hydrogen refueling station and together select operational modes, such as operational mode 1-A through any operational mode N as illustrated in FIGS. 2, 3, 4, 5, 6, 7, 8, 9, 10, 11, 12, 13, 14, 15, and 16.

Figure 2:
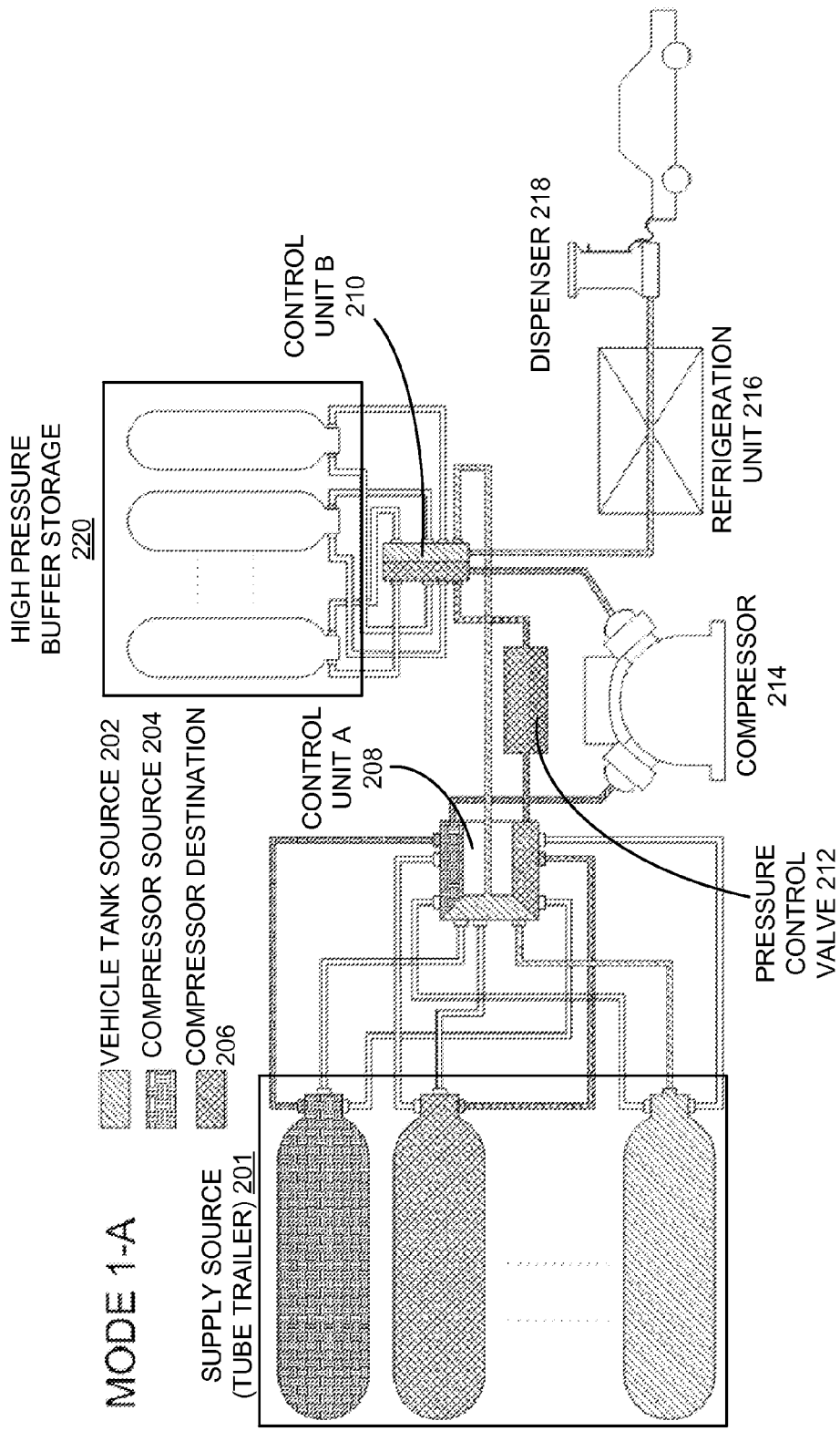
FIGS. 2, 3, 4, 5, 6, 7, 8, 9, 10, 11, 12, 13, 14, 15 and 16 are respective schematic and block diagram representations of an example apparatus operating in respective operational modes in accordance with the preferred embodiments.
Figure 3:
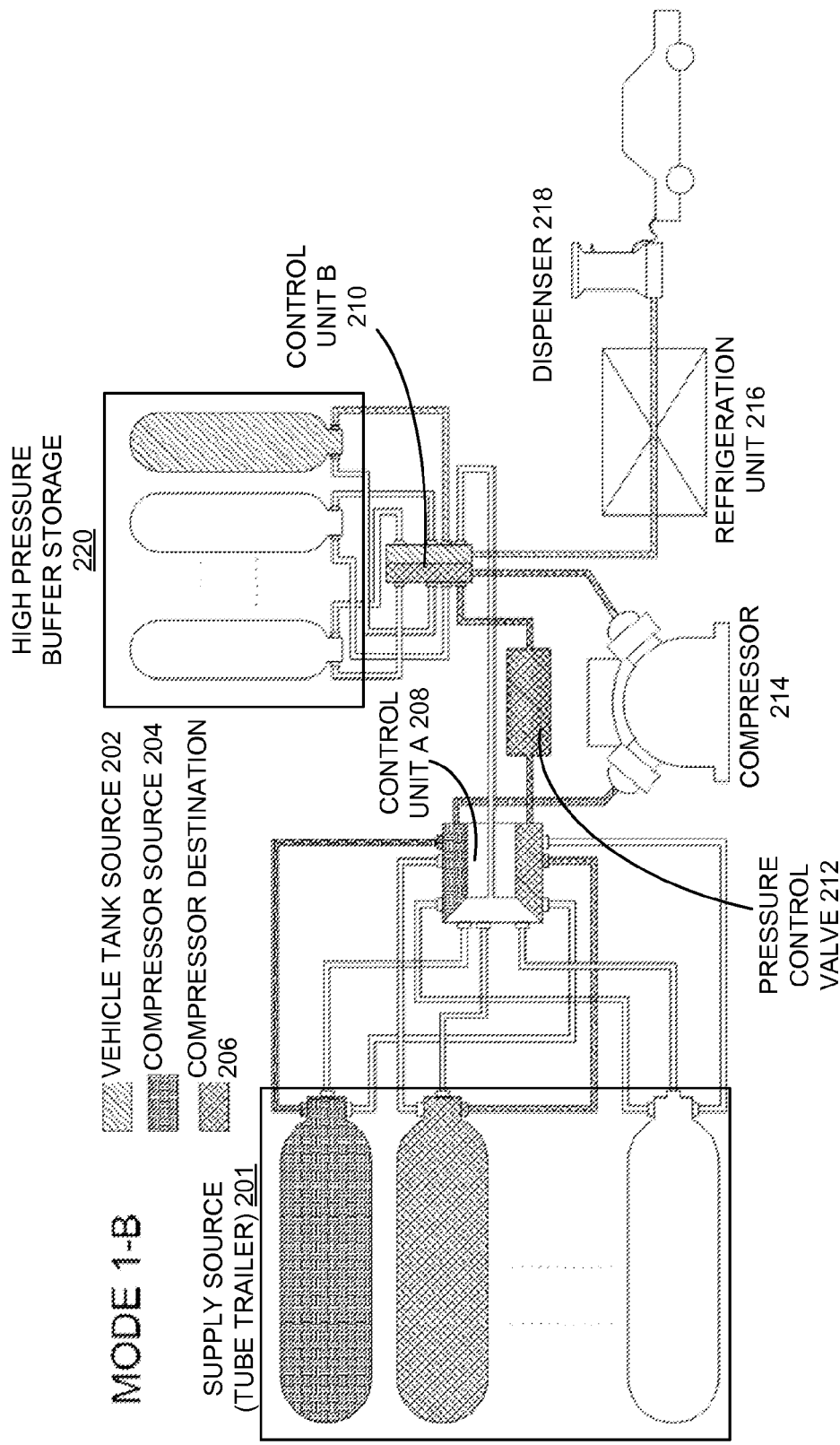
Figure 4:
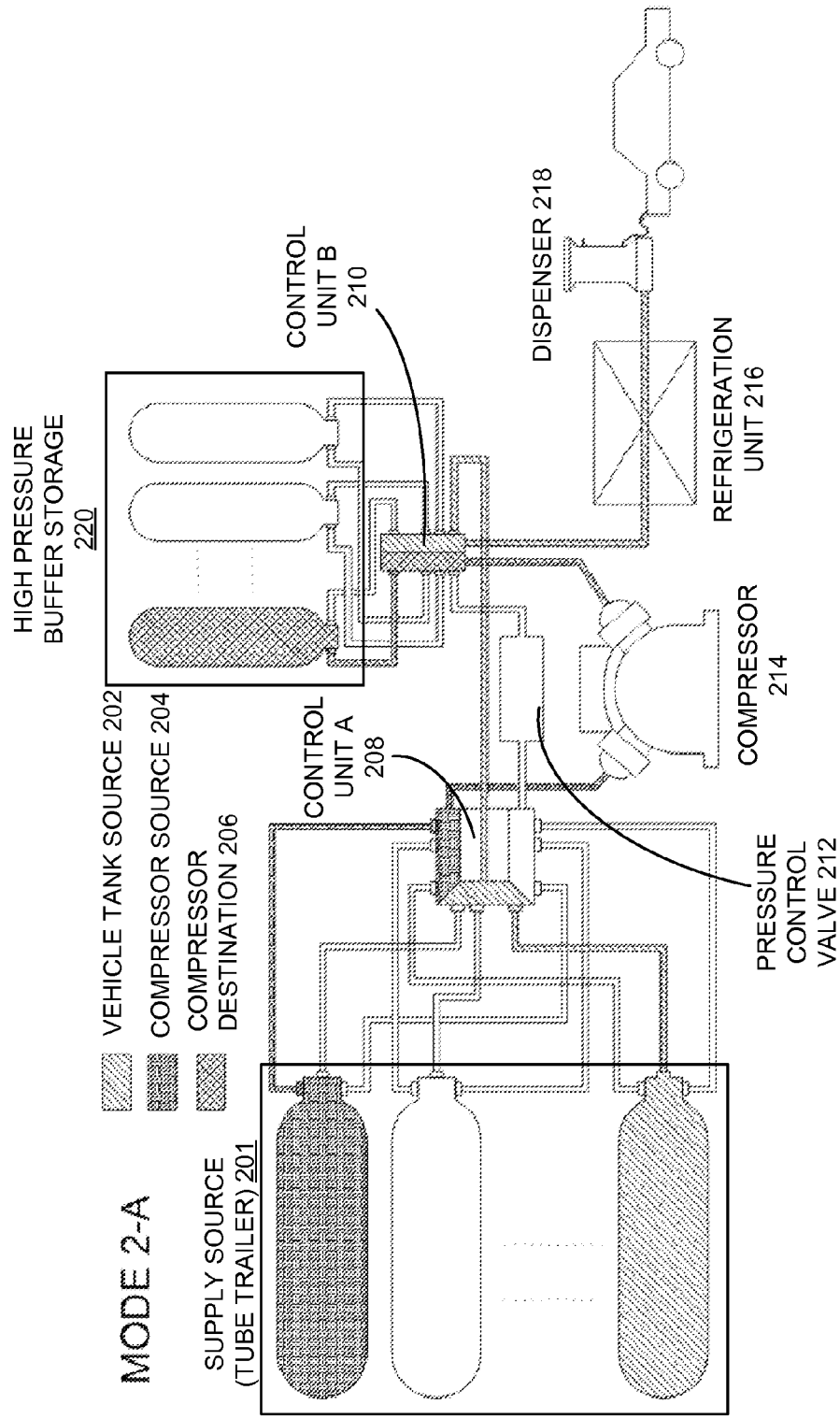
Figure 5:
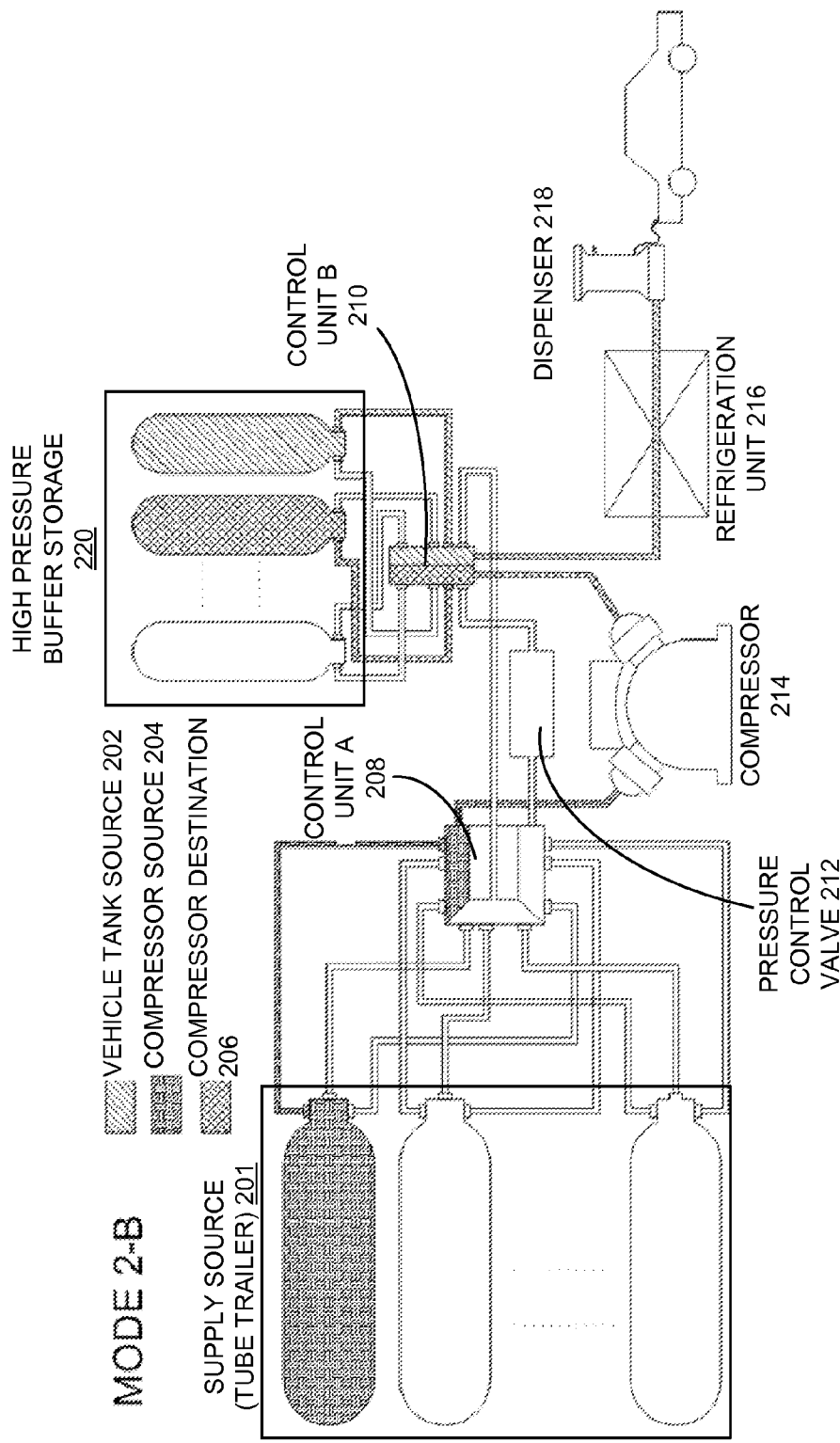
Figure 6:
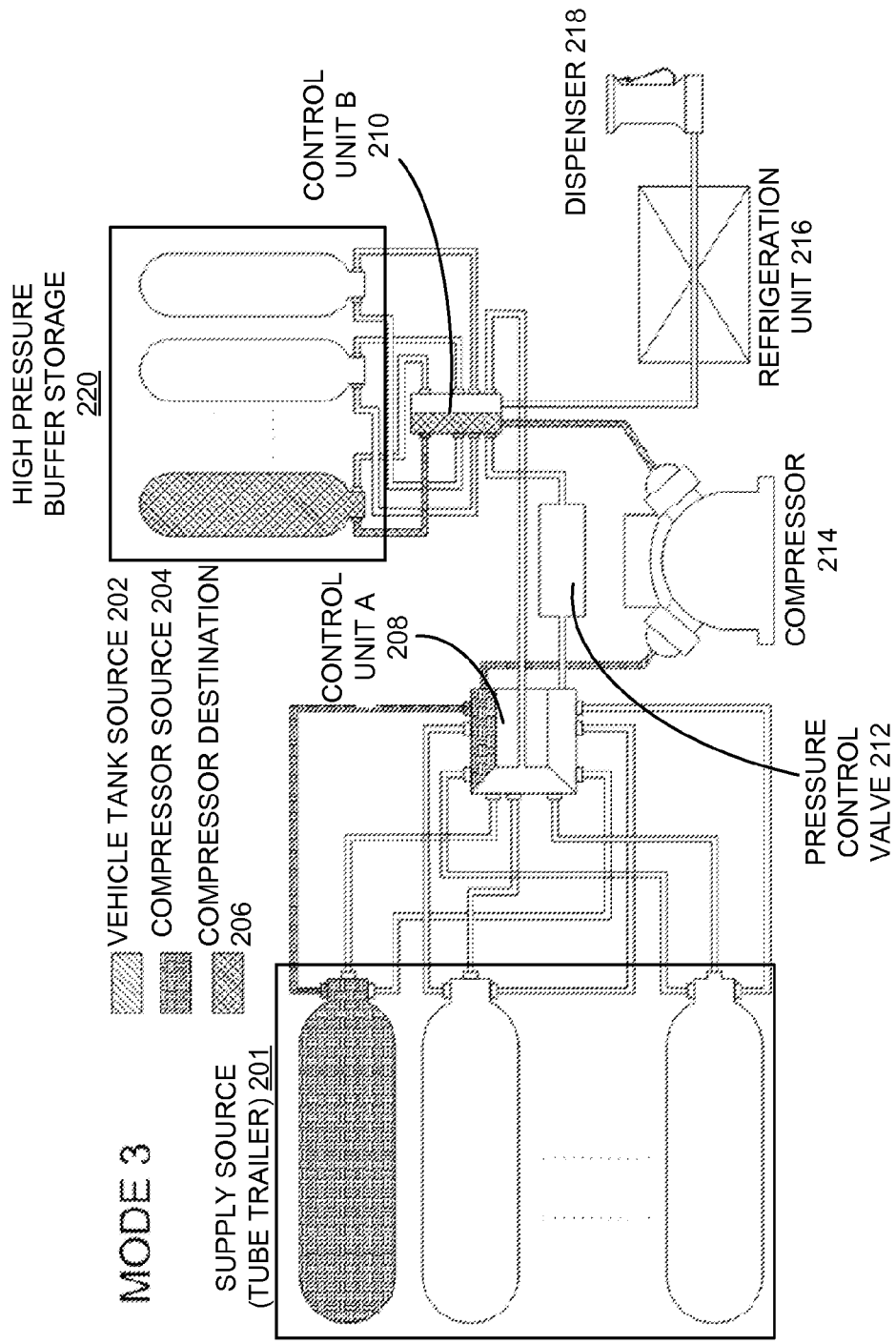
Figure 7:
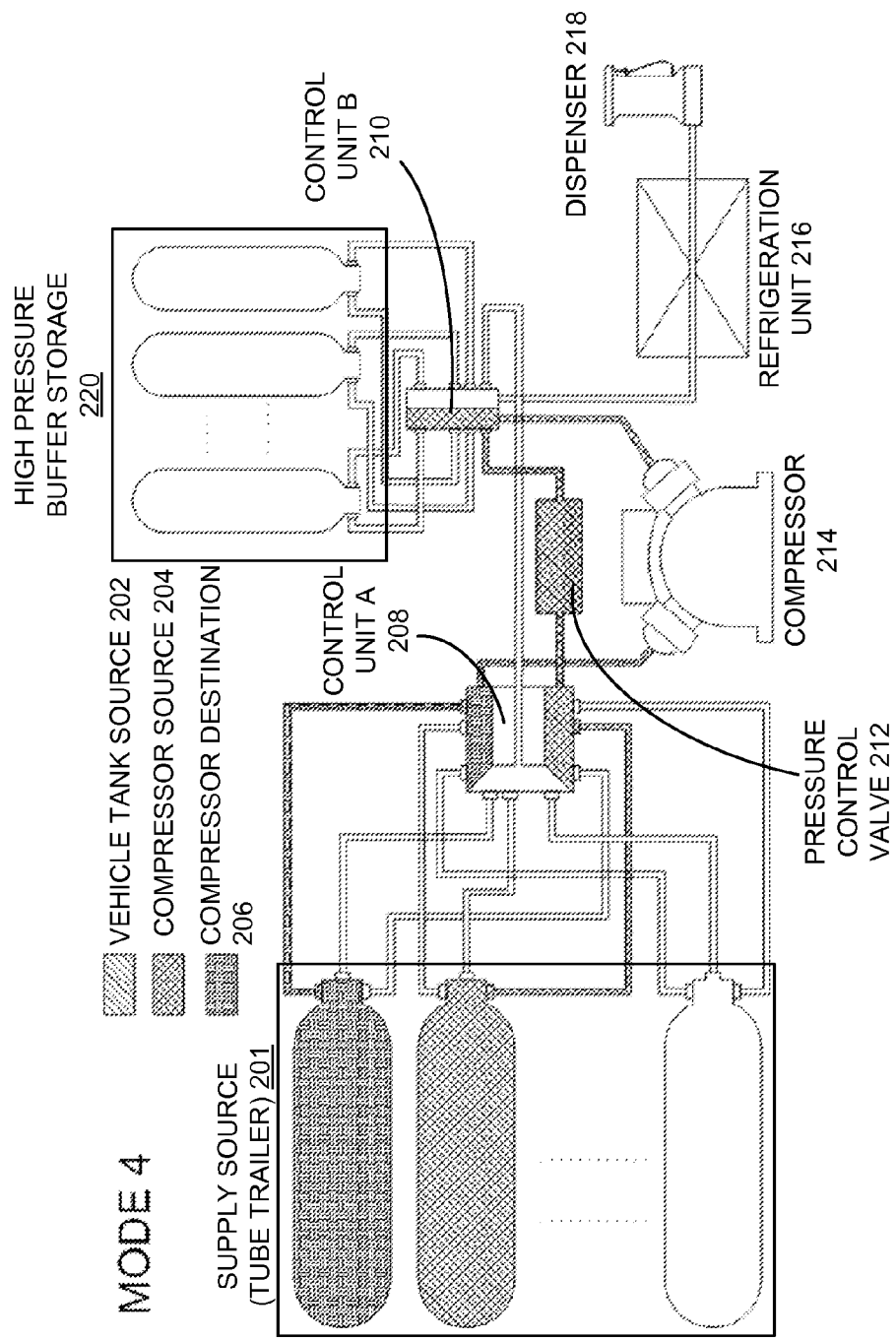

As indicated in a block 108, the first control unit A 208 controls the source of the molecules withdrawn from the tanks of the tube trailer during different operational modes, as well as the destination tube for the molecules when tubes are consolidated and control unit B 210 controls the molecules flow to and from the buffer storage during different operational modes. For all modes of operation, whenever the pressure (or mass) in the tank or tube of the tube trailer (or any supply source consisting of individual cylinders) which supplies hydrogen to the compressor 214 falls below the return pressure (or mass in the tank at return pressure), the source 201 is switched to the tank with lowest (above the return pressure) or highest pressure at that instant depending on the mode of operation. The tube trailer tank with the lowest pressure (above return pressure) is always the source supplying the compressor 214 for modes 1-A, 1-B and 4 such as illustrated in FIGS. 2, 3, and 7, while the tank of tube trailer with the highest pressure is always the source supplying the compressor for modes 2 and 3, such as illustrated in FIGS. 4, 5, and 6. Alternatively during the modes 2 and 3 the tank of tube trailer with lowest pressure (above the return pressure) can also be used as the supplying source of the compressor during the hours when the refueling demand is low (i.e. the outlet flow rate of the compressor is not critical to address the hourly demand at that instant of time). It also should be noted that the control unit A can change the source tank supplying the compressor dynamically according to the pressures in the source tubes at any instant of time. Similarly, control unit B can change the destination of compressor outlet dynamically according to the pressures in the destination tanks at any instant of time.

Referring now to FIG. 1B, there are shown example steps for selecting respective operational modes of the hydrogen refueling station in accordance with the preferred embodiments. As indicated in a block 110, a state of the hydrogen refueling station is identified to start an operational mode. As indicated in a block 112, the buffer storage capacity is identified and whether the dispenser hose is activated to begin refueling is identified. An operational mode is selected and the selected operational mode (one of the operational mode 1-A through operational mode N, where N=11 as shown in FIGS. 2-16) is started as indicated in a block 114.

As indicated in a block 116, in operation of the hydrogen refueling station in accordance with the preferred embodiments, the first control unit A 208 controls the source of the molecules withdrawn from the tubes of the supply source 201 during different operational modes, as well as the destination of the molecules when tubes are consolidated and control unit B 210 controls the molecules flow to and from the buffer storage during different operational modes. As indicated in a block 118, at the end of each selected operational mode the state of the hydrogen refueling station is assessed and the next mode of operation is determined.

Referring now to FIGS. 2 and 3, a first state of the hydrogen refueling station includes the high pressure buffer storage 220 is at full capacity and the dispenser hose 218 is activated by a vehicle to begin refueling.

As illustrated in FIG. 2, in an operational mode 1-A the dispenser 218 is directly connected to the tube trailer source 201 for initial vehicle fill. Hydrogen H2 is directly withdrawn from the tube of tube trailer source 201 with the highest pressure (i.e., bypassing compressor and buffer storage) to initially fill the vehicle's tank. This mode ends when the mass flow rate between the tube and the vehicle's tank reach a predefined lower limit. Simultaneously, the tube of the supply source 201 with the second highest pressure is being filled (consolidated) from the tube with the lowest pressure (above the return pressure) through the compressor. The consolidation continues until the mode ends or consolidation is complete (i.e., all tubes, except the one being drawn from, are either at rated pressure or return pressure).

As illustrated in FIG. 3, in a next operational mode 1-B immediately following Mode 1-A, the dispenser 218 is directly connected to the buffer storage 220 to fill the vehicle through control unit B 210. The H2 is drawn from the lowest pressure buffer storage vessel (that is above the vehicle's tank pressure at that instant) to continue filling the vehicle's tank. This mode continues until the mass flow rate between the lowest pressure buffer storage vessel and the vehicle's tank reach a predefined lower limit. At this point, this mode ends and switches to mode 2-B to complete the vehicle's fill. Simultaneously during mode 1B, the tube of supply source 201 with the highest pressure (below the rated pressure) is being filled (consolidated) from the tube with the lowest pressure (above the return pressure) through the compressor. This consolidation continues until this mode ends or until consolidation is complete (i.e., all tubes, except the one being drawn from, are either at rated pressure or return pressure).

Referring now to FIGS. 4 and 5, a second state of the hydrogen refueling station includes the high pressure buffer storage 220 is not at full capacity and the dispenser hose 218 is activated by a vehicle to begin refueling.

As illustrated in FIG. 4, in an operational mode 2-A the dispenser 218 is directly connected to the tube trailer source 201 for initial vehicle fill. Hydrogen H2 is directly withdrawn from the tube of tube trailer source 201 with the highest pressure (i.e., bypassing compressor and buffer storage) to fill the vehicle's tank. This mode ends when the mass flow rate between the tube and the vehicle's tank reach a predefined lower limit. Simultaneously, the vessel of buffer storage 220 with the highest pressure is being filled from the tube trailer tube with the second highest pressure through the compressor 214. Once this buffer storage vessel reaches its maximum rated pressure, the flow switches to the next highest pressure buffer storage vessel. This continues until this mode ends or until all the buffer storage vessels reach their maximum rated pressures (whichever happens first).

As illustrated in FIG. 5, in a next operational mode 2-B immediately following Mode 2-A or 1-B the dispenser 218 is directly connected to the buffer storage 220 to fill the vehicle. The H2 is drawn from the lowest pressure buffer storage vessel (that is above the vehicle's tank pressure at that instant) to continue filling the vehicle's tank. This mode continues until the mass flow rate between the lowest pressure buffer storage vessel and the vehicle's tank reach a predefined lower limit. At this point, the dispenser switches the source of hydrogen to flow from the next higher pressure buffer storage vessel. This mode ends when the vehicle reaches its maximum rated pressure, temperature or state of charge. Simultaneously, the highest pressure vessel of buffer storage 220 not discharging to the vehicle's tank is being filled from the tube trailer tube with the highest pressure through the compressor 214. Once this buffer storage vessel reaches its maximum rated pressure, the flow switches to the next highest pressure buffer storage vessel (below the maximum rated pressure) not discharging to the vehicle's tank. This continues until all the buffer storage vessels reach their maximum rated pressures.

Referring now to FIG. 6, a third state of the hydrogen refueling station includes the high pressure buffer storage 220 is not at full capacity and the dispenser hose 218 is not activated by a vehicle. As illustrated in FIG. 6, in an operational mode 3 the vessel of buffer storage 220 with the highest pressure is filled from the tube of tube trailer source 201 with the highest pressure through the compressor 214 until buffer storage vessel reaches its maximum rated pressure. Then the flow switches to fill the next highest pressure vessel (below the maximum rated pressure) of buffer storage 220 from the same tube through the compressor 214. This sequence continues until all the vessels of buffer storage 220 reach their maximum rated pressures (i.e., buffer storage is at full capacity) or until the dispenser hose is activated to fill a vehicle.

Referring now to FIG. 7, a fourth state of the hydrogen refueling station includes the high pressure buffer storage 220 is at full capacity and the dispenser hose 218 is not activated by a vehicle. As illustrated in FIG. 7, in an operational mode 4 the tube of tube trailer source 201 with the highest pressure (below the rated pressure) is being filled (consolidated) from the tube of tube trailer source 201 with the lowest pressure (above the return pressure) through the compressor 214. This continues until consolidation is complete (i.e., all tubes, except the one being drawn from, are either at rated pressure or return pressure) or until the dispenser hose 218 is activated to fill a vehicle.

In accordance with features of the invention, the tube of tube trailer source 201 with the lowest pressure (above return pressure) is always the source supplying the compressor for modes 1-A, 1-B and 4, while the tube of tube trailer source 201 with the highest pressure is always the source supplying the compressor for modes 2-A, 2-B and 3. Alternatively the tube of tube trailer source 201 with lowest pressure can be used as the source supplying the compressor for modes 2-A and 3 during hours with very low refueling demand.

Referring now to FIGS. 8, 9, 10, and 11, respective operational modes 5, 6, 7 and 8 are illustrated where the tube trailer source 201 is not used for filling the vehicle's tank initially.

Figure 8:
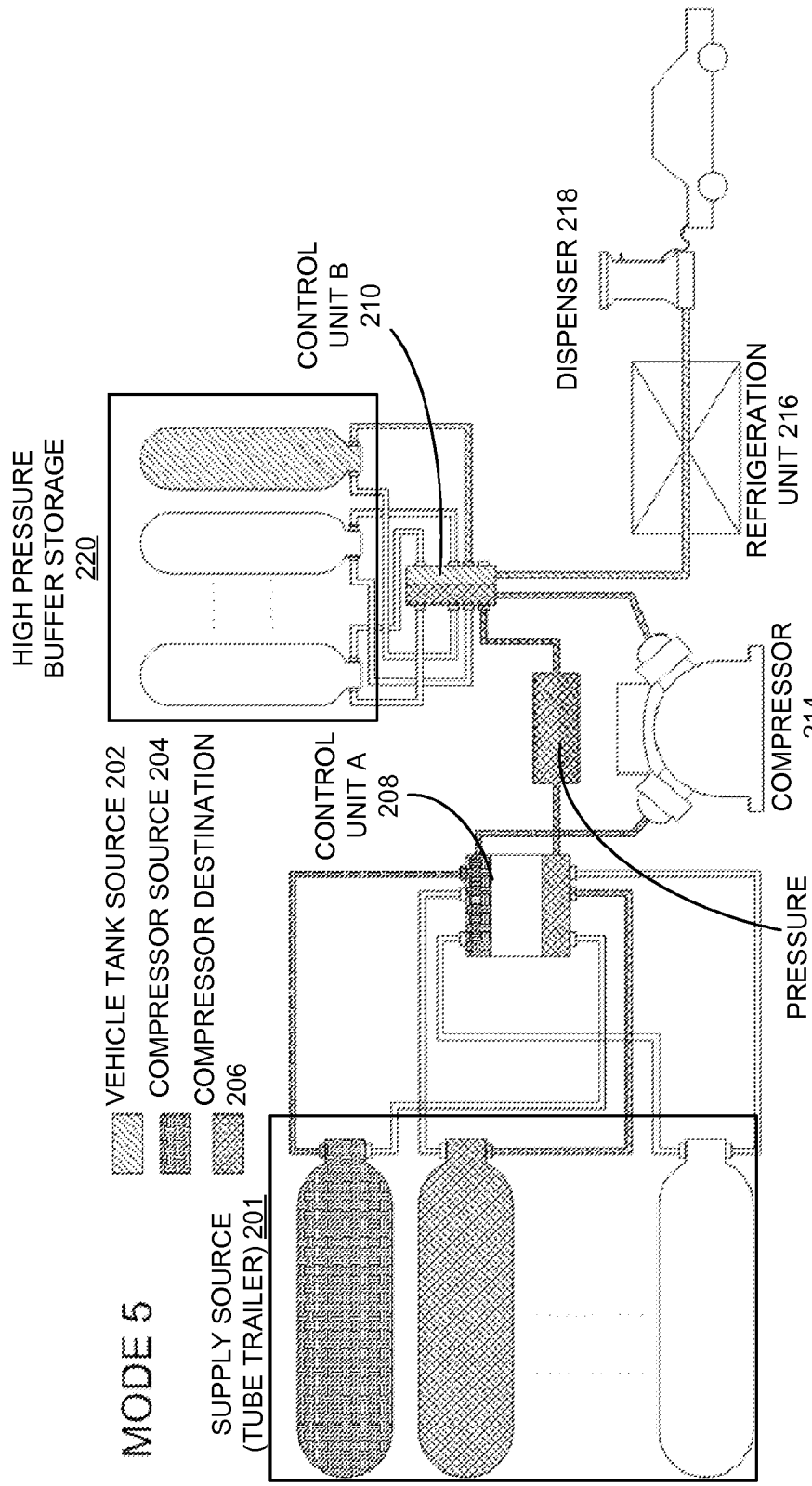

As illustrated in FIG. 8, in the operational mode 5, the conditions and operation are similar to mode 1-B shown in FIG. 3, the first state of the hydrogen refueling station includes the high pressure buffer storage 220 which is at full capacity and the dispenser hose 218 is activated by a vehicle to begin refueling. The dispenser 218 is connected to the buffer storage 220 to fill the vehicle. Simultaneously, the tube of supply source 201 with the highest pressure (below the rated pressure) is being filled (consolidated) from the tube with the lowest pressure (above the return pressure) through the compressor 214. This consolidation continues until this mode ends or until consolidation is complete (i.e., all tubes, except the one being drawn from, are either at rated pressure or return pressure).

Figure 9:
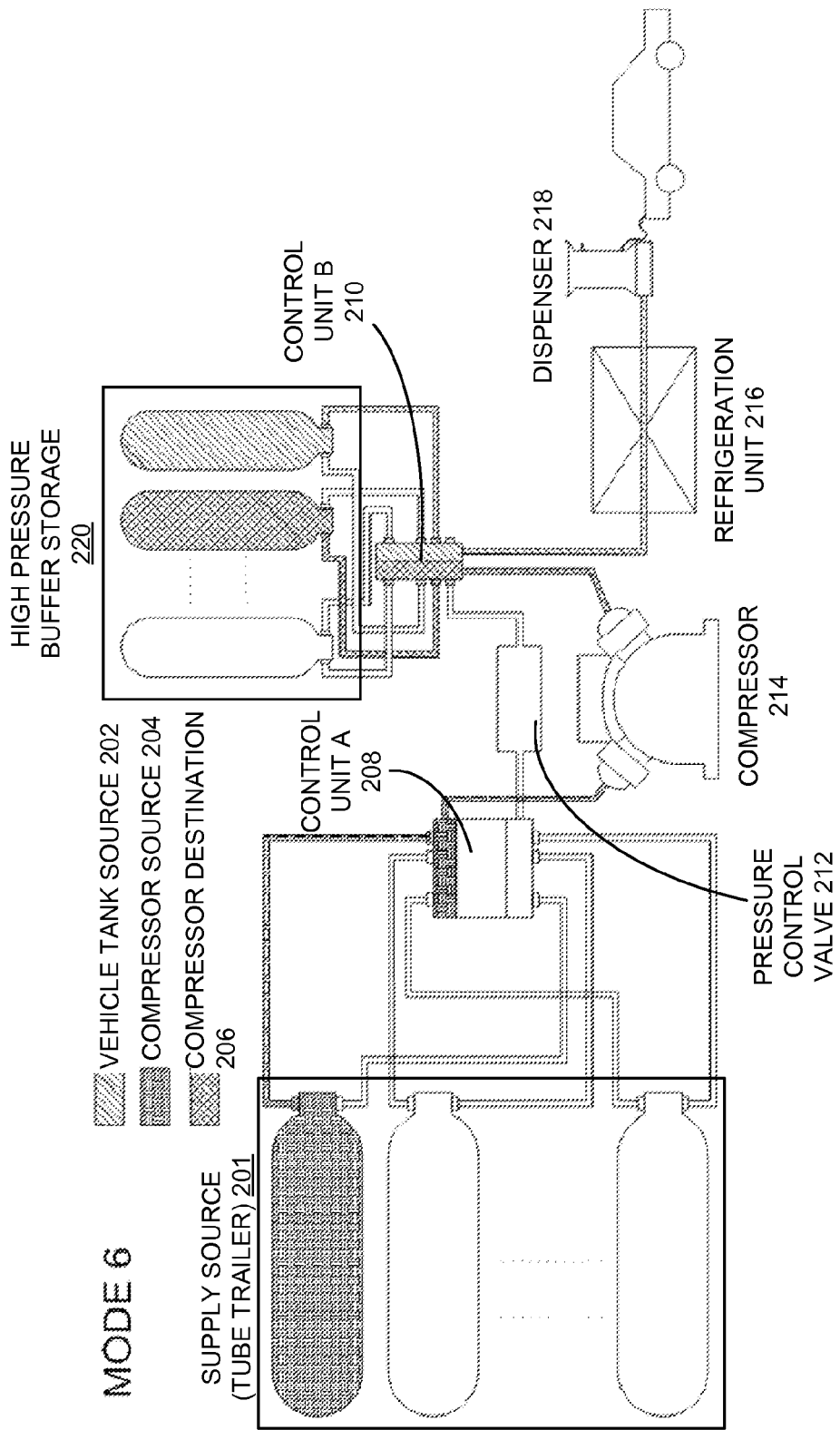

As illustrated in FIG. 9, in the operational mode 6, the conditions and operation are similar to mode 2-B shown in FIG. 5, the first state of the hydrogen refueling station includes the high pressure buffer storage 220 which is not at full capacity and the dispenser hose 218 is activated by a vehicle to begin refueling. The dispenser 218 is connected to the buffer storage 220 to fill the vehicle. Simultaneously, the vessel of buffer storage 220 with the highest pressure (below the maximum rated pressure) is being filled from the tube with the highest pressure through the compressor 214. Once this buffer storage vessel reaches its maximum rated pressure, the flow destination switches to the next highest pressure buffer storage vessel. This continues until this mode ends or until all the buffer storage vessels reach their maximum rated pressures (whichever happens first).

Figure 10:
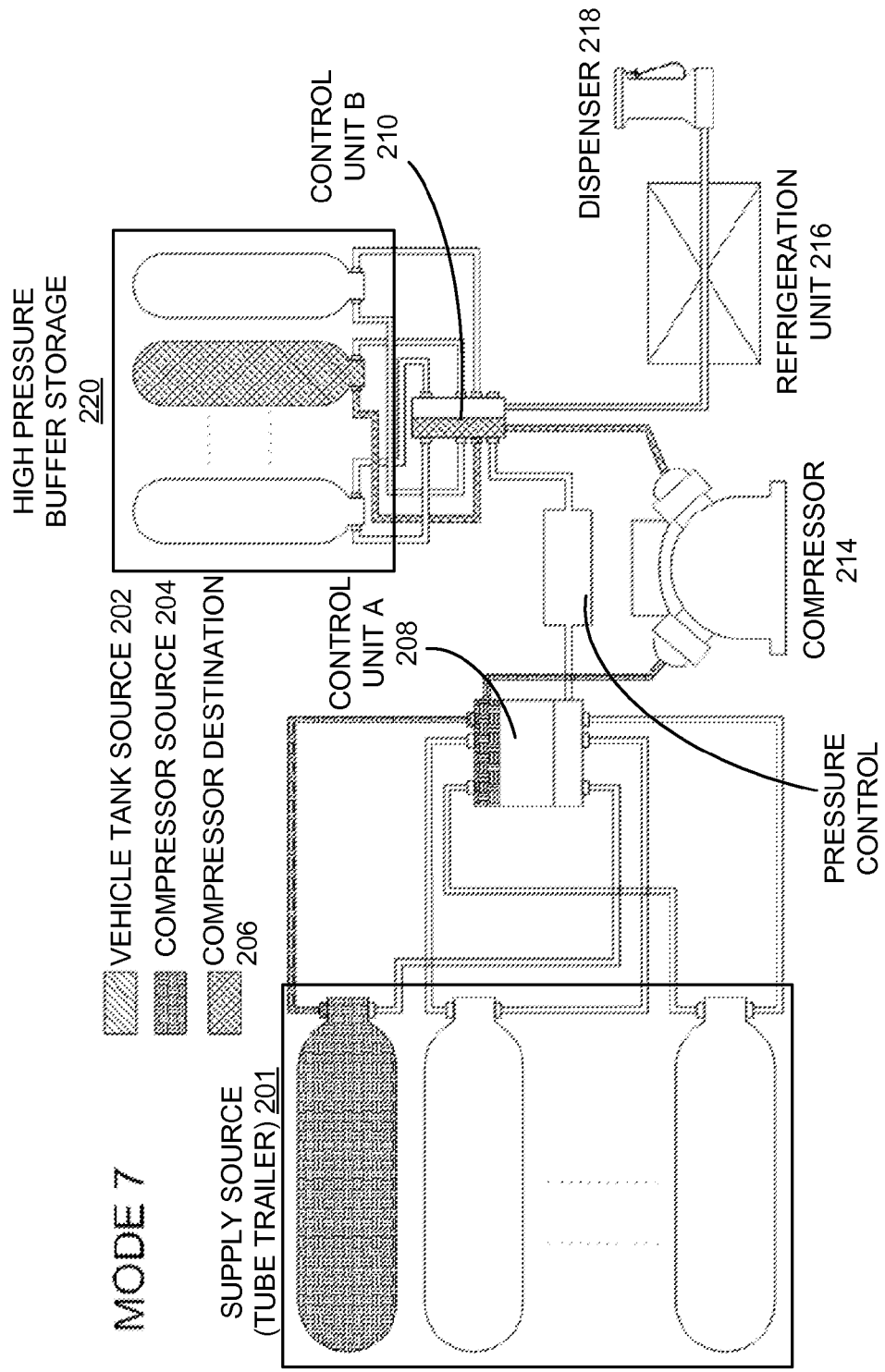

As illustrated in FIG. 10, in the operational mode 7, the conditions and operation are similar to mode 3 shown in FIG. 6, the first state of the hydrogen refueling station includes the high pressure buffer storage 220 which is not at full capacity and the dispenser hose 218 is not activated by a vehicle to begin refueling. The vessel of buffer storage 220 with the highest pressure (below the maximum rate pressure) is filled from the tube of tube trailer source 201 with the highest pressure through the compressor 214 until the buffer storage vessel reaches its maximum rated pressure, and then continues to fill the next highest pressure buffer storage vessel. This continues until all the buffer storage vessels reach their maximum rated pressures or until the dispenser hose is activated for refueling.

Figure 11:
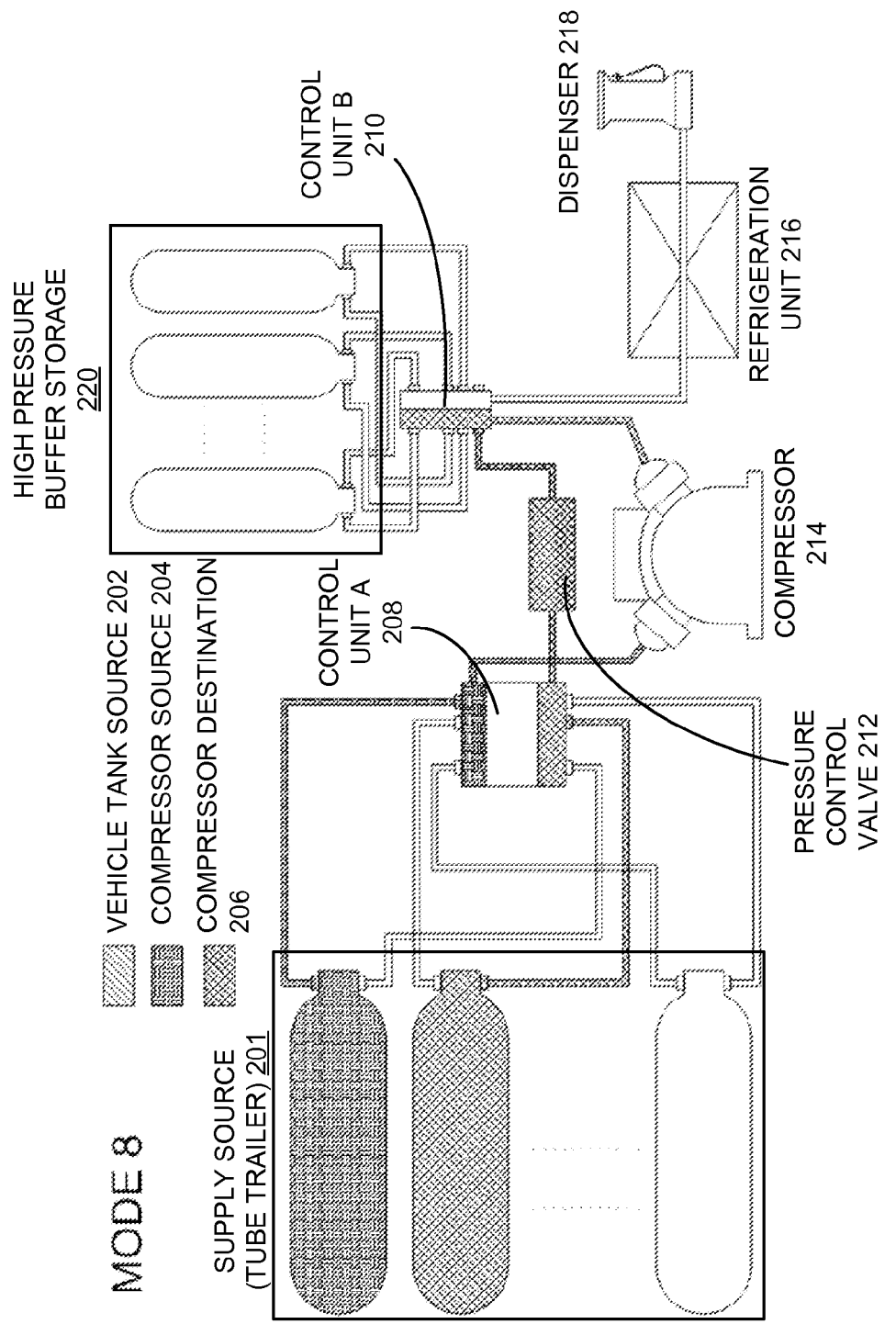

As illustrated in FIG. 11, in the operational mode 8, the conditions and operation are similar to mode 4 shown in FIG. 7, the first state of the hydrogen refueling station includes the high pressure buffer storage 220 which is at full capacity and the dispenser hose 218 is not activated by a vehicle to begin refueling. In the operational mode 8 the tube of tube trailer source 201 with the highest pressure (below the rated pressure) is being filled (consolidated) from the tube of tube trailer source 201 with the lowest pressure (above the return pressure) through the compressor 214. This continues until consolidation is complete (i.e., all tubes, except the one being drawn from, are either at rated pressure or return pressure) or until the dispenser hose 218 is activated to fill a vehicle.

Referring now to FIGS. 12 and 13, the hydrogen refueling station includes the first compressor 1, 1210 and the second compressor 2, 1212 that operate independently in respectively operational modes 9 and 10. Considering the fact that when there are two compressors at the refueling station it is beneficial only when both the compressors 1210 and 1212 are working and not idle. When any of these two compressors are idle then there is no advantage over having a single compressor that can operate more frequently and serve the purpose of the two compressors. Of all possible operating modes similar to the modes 1-4 or 5-8, both compressors will be working simultaneously only in two modes which are shown in FIGS. 12 and 13. Alternatively the control unit A 208, which is assumed to handle three independent streams of hydrogen, or any gaseous fuel, may have the capability to handle four or more gaseous streams simultaneously. In such case the two compressors 1210 and 1212 can be working simultaneously in more modes in addition to the two modes shown in FIGS. 12 and 13.

As illustrated in FIG. 12 in operational mode 9, two tubes of the tube trailer source 201 respectively are the compressor 1 source 1204 and the compressor 1 destination 1206, another tube of the tube trailer source 201 is the compressor 2 source 1208 and one vessel of the high pressure buffer storage 220 is the compressor 2 destination 1209. The dispenser 218 is connected to the buffer storage 220 through control unit B 210 to fill the vehicle tank.

As illustrated in FIG. 13 in operational mode 10, two tubes of the tube trailer source 201 respectively are the compressor 1 source 1204 and the compressor 1 destination 1206, another tube of the tube trailer source 201 is the compressor 2 source 1208 and one vessel of the high pressure buffer storage 220 is the compressor 2 destination 1209. For example, in operational mode 10 the vessel of buffer storage 220 with the highest pressure (below the maximum rated pressure) is filled from the tube of tube trailer source 201 with the highest pressure through the compressor 2, 1212 until it reaches its maximum rated pressure. Then the flow switches to fill the next highest pressure vessel (below the maximum rated pressure) of buffer storage 220 from the same tube through the compressor 2, 1212. This sequence continues until all the vessels of buffer storage 220 reach their maximum rated pressures (i.e., buffer storage is at full capacity) or until the dispenser hose is activated to fill a vehicle. Simultaneously, in operational mode 10 the tube of tube trailer source 201 with the second highest pressure (below the maximum rated pressure) is being filled (consolidated) from the tube of tube trailer source 201 with the lowest pressure (above the return pressure) through the compressor 1, 1210. This consolidation continues until the consolidation is complete (i.e., all tubes, except the one being drawn from, are either at rated pressure or return pressure) or until the dispenser hose is activated for refueling.

As shown in FIGS. 14, 15 and 16, alternatively the refueling station can be operated without a high pressure buffer storage system representing modes 11A, 11-B and 11-C.

As illustrated in FIG. 14, in an operational mode 11-A, the dispenser 218 is directly connected to the tube trailer source 201 through control unit A 208 for initial vehicle fill. Hydrogen H2 is directly withdrawn from the tube of tube trailer source 201 with the highest pressure (i.e., bypassing compressor) to fill the vehicle's tank. This mode ends when the mass flow rate between the tube and the vehicle's tank reach a predefined lower limit. Simultaneously, the tube of the supply source 201 with the second highest pressure is being filled (consolidated) from the tube with the lowest pressure (above the return pressure) through the compressor 214. This consolidation continues until the mode ends or consolidation is complete (i.e., all tubes, except the one being drawn from, are either at rated pressure or return pressure).

As illustrated in FIG. 15, in a next operational mode 11-B immediately following Mode 11-A, the dispenser 218 is directly connected to the output of the compressor 214 through control unit B (need a number here) to continue filling the vehicle tank. This mode ends when the vehicle reaches its maximum pressure, temperature or rated state of charge.

Referring now to FIG. 16, showing the mode 11-C, which is similar to the mode 4 operation, when the dispenser hose 218 is not activated by a vehicle. As illustrated in FIG. 16, in an operational mode 11-C the tube of tube trailer source 201 with the highest pressure (below the rated maximum working pressure) is being filled (consolidated) from the tube of tube trailer source 201 with the lowest pressure (above the return pressure) through the compressor 214. This consolidation continues until consolidation is complete (i.e., all tubes, except the one being drawn from, are either at rated pressure or return pressure) or until the dispenser hose 218 is activated for refueling.

While the present invention has been described with reference to the details of the embodiments of the invention shown in the drawing, these details are not intended to limit the scope of the invention as claimed in the appended claims.

What is claimed is:

1. A method for operating a refueling station to reduce refueling cost comprising:
providing the refueling station with a gaseous fuel supply source including a plurality of tanks on a tube trailer coupled to a first control unit, and high pressure buffer storage having predefined capacity coupled to a second control unit and the first tube trailer tanks by a pressure control valve and the first control unit, a single compressor, and a dispenser;
delivering said plurality of tanks on said tube trailer to the refueling station having a predetermined maximum working pressure and emptying said plurality of tanks on said tube trailer to an agreed minimum return pressure;
monitoring a state of the hydrogen refueling station;
operating the hydrogen refueling station at different operational modes depending on the state of the hydrogen refueling station at the beginning of each operational mode with said first control unit controlling said gaseous fuel flow to and from said plurality of tanks on said tube trailer and controls switching between a respective tube of said plurality of tubes at any point of operation for consolidating fuel between said plurality of tanks on said tube trailer, and directly delivering fuel to said dispenser from said plurality of tanks on said tube trailer, and said second control unit controlling gaseous fuel flow to and from said high pressure buffer storage during selected operational modes and directly delivering fuel to the dispenser from said high pressure buffer storage; and
assessing the hydrogen refueling system at the end of each operational mode to identify the state of the system and selecting a next mode of operation.

2. The method as recited in claim 1, wherein operating the hydrogen refueling station at different modes depending on the state of the hydrogen refueling station includes providing a first operational mode directly connecting said dispenser to one of said plurality of tanks on said tube trailer for refueling a vehicle.

3. The method as recited in claim 2, includes providing a second operational mode connecting said dispenser to said high pressure buffer storage to fill the vehicle following the first operational mode.

4. The method as recited in claim1 wherein operating the hydrogen refueling station at different modes depending on the state of the hydrogen refueling station includes consolidating gaseous fuel within said tanks on said tube trailer.

5. The method as recited in claim 1 wherein operating the hydrogen refueling station at different modes depending on the state of the hydrogen refueling station includes providing one operational mode when said dispenser is not activated by a vehicle to begin refueling, and said high pressure buffer storage is not at full capacity, operating said compressor to fill said high pressure buffer storage from said tanks on said tube trailer.

6. The method as recited in claim 1 wherein operating the hydrogen refueling station at different modes depending on the state of the hydrogen refueling station includes providing one operational mode when said dispenser is not activated by a vehicle to begin refueling, and said high pressure buffer storage is at full capacity, operating said compressor to consolidate hydrogen between said tanks on said trailer.

7. The method as recited in claim 1 wherein operating the hydrogen refueling station at different modes depending on the state of the hydrogen refueling station includes providing predefined selected operational modes when said tanks on said tube trailer are not initially used for refueling a vehicle.

8. The method as recited in claim 1 wherein operating the hydrogen refueling station at different modes depending on the state of the hydrogen refueling station includes providing predefined selected operational modes when said single compressor is operated independently by said first control unit and said second control unit.

9. The method as recited in claim 8 includes connecting said dispenser to said high pressure buffer storage to fill the vehicle.

10. The method as recited in claim 8 includes operating said single compressor to fill the high pressure buffer storage from said tanks on said tube trailer.

11. The method as recited in claim 8 includes operating said single compressor to consolidate hydrogen between said tanks on said tube trailer.

12. A method for operating a hydrogen refueling station to reduce refueling cost comprising:
    providing the hydrogen refueling station with a gaseous fuel supply source including a plurality of tanks on a tube trailer coupled to a first control unit and coupled to a second control unit by a pressure control valve, a single compressor, and a dispenser;
    monitoring a state of the hydrogen refueling station;
    delivering said plurality of tanks on said tube trailer to the hydrogen refueling station having a predetermined maximum working pressure and emptying said plurality of tanks on said tube trailer to an agreed minimum return pressure;
    operating the hydrogen refueling station at different operational modes depending on the state of the hydrogen refueling station at the beginning of each operational mode, with said first control unit controlling said gaseous fuel flow to and from said plurality of tanks on said tube trailer and controls switching between a respective tube of said plurality of tubes at any point of operation for consolidating fuel between said plurality of tanks on said tube trailer, and directly delivering fuel to said dispenser from said plurality of tanks on said tube trailer, and said second control unit controlling gaseous fuel flow to and from said high pressure buffer storage during selected operational modes and directly delivering fuel to the dispenser from said high pressure buffer storage, each during selected operational modes; and
    assessing the hydrogen refueling system at the end of each operational mode to identify the state of the system and selecting a next mode of operation.

13. The method as recited in claim 12 includes said first control unit and said second control unit operating the hydrogen refueling station at different operational modes including consolidating hydrogen between said tanks on said tube trailer.

* * * * *